(12) United States Patent
Allen et al.

(10) Patent No.: US 8,344,543 B2
(45) Date of Patent: Jan. 1, 2013

(54) MODULAR DEVICE

(75) Inventors: Fred Allen, Princeton Junction, NJ (US);
Steve D. Simon, Middletown, NJ (US);
Victor A. Lifton, Bridgewater, NJ (US);
Ronald Durando, Nutley, NJ (US)

(73) Assignee: mPhase Technologies, Inc., Little Falls, NJ (US)

( * ) Notice: Subject to any disclaimer, the term of this patent is extended or adjusted under 35 U.S.C. 154(b) by 655 days.

(21) Appl. No.: 12/552,466

(22) Filed: Sep. 2, 2009

(65) Prior Publication Data
US 2011/0049982 A1    Mar. 3, 2011

(51) Int. Cl.
*H02J 1/10* (2006.01)

(52) U.S. Cl. .......................... 307/38; 307/29

(58) Field of Classification Search .......... 307/29, 307/38
See application file for complete search history.

(56) References Cited

U.S. PATENT DOCUMENTS

| | | |
|---|---|---|
| 1,506,302 A | 8/1924 | Hopkins |
| 2,896,067 A | 7/1959 | Lockwood |
| 3,065,337 A | 11/1962 | Torgerson |
| 3,486,944 A | 12/1969 | O'Donnell et al. |
| 3,665,178 A | 5/1972 | Sussingham et al. |
| 3,716,708 A | 2/1973 | Kaye |
| 3,827,914 A | 8/1974 | Kaye |
| 7,029,439 B2 * | 4/2006 | Roberts et al. ............ 600/199 |
| 7,458,934 B2 * | 12/2008 | Roberts et al. ............ 600/249 |
| 7,670,287 B2 * | 3/2010 | Roberts et al. ............ 600/200 |
| 8,145,327 B2 * | 3/2012 | Banks et al. .............. 700/19 |

* cited by examiner

*Primary Examiner* — Hal Kaplan
(74) *Attorney, Agent, or Firm* — Neustel Law Offices

(57) ABSTRACT

A modular device for use in emergency or everyday applications and having a plurality of modular components that are interchangeable with one another depending on the particular desired use. The modular device generally includes a plurality of interchangeable load modules, wherein each of the load modules has a load connected thereto, wherein the load is different for each load modules, and at least one power module having at least one battery therein, wherein the power module removably separately connects to each of the load modules and wherein the battery(ies) electrically connects to the load for powering the load. The load modules and power modules may be connected in various manners, such as a push-fit, friction, threadably, slidably, or various other manners to allow quick, easy, and reliable connectivity. The load of the load modules may be comprised of lights, external connectors, radios, MP3 players, or various other electrical devices.

7 Claims, 14 Drawing Sheets

MODULAR DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a powered device and more specifically it relates to a modular device for providing multiple modular components that may be interchanged as desired.

2. Description of the Related Art

Any discussion of the related art throughout the specification should in no way be considered as an admission that such related art is widely known or forms part of common general knowledge in the field.

Electrical devices, such as flashlights, radios, and powered external connectors have been in use for years. Typically each of these devices includes its own housing, wherein to use more than one device an entire separate device including its own power module must be carried. This can often lead to individuals forgetting devices or simply not having enough room to carry all of their desired devices. In addition, because each device needs its own power supply, the user often times has to purchase multiple sets of batteries.

In addition, many devices that are rarely used, such as those used in emergency applications generally include primary batteries, wherein the primary batteries tend to drain over time thus forcing the user to continually check the batteries if they want to ensure that the device will work when needed. This can be tedious and costly to constantly check and replace the batteries. Because of the inherent problems with the related art, there is a need for a new and improved modular device for providing a modular flashlight for use in emergency or everyday applications and having a plurality of modular components that are interchangeable with one another depending on the particular desired use.

BRIEF SUMMARY OF THE INVENTION

A system for providing a modular device for use in emergency or everyday applications and having a plurality of modular components that are interchangeable with one another depending on the particular desired use. The invention generally relates to a powered device which includes a plurality of interchangeable load modules, wherein each of the load modules has a load connected thereto, wherein the load is different for each load modules, and at least one power module having at least one battery therein, wherein the power module removably separately connects to each of the load modules and wherein the battery(ies) electrically connects to the load for powering the load. The load modules and power modules may be connected in various manners, such as a push-fit, friction, threadably, slidably, or various other manners to allow quick, easy, and reliable connectivity.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
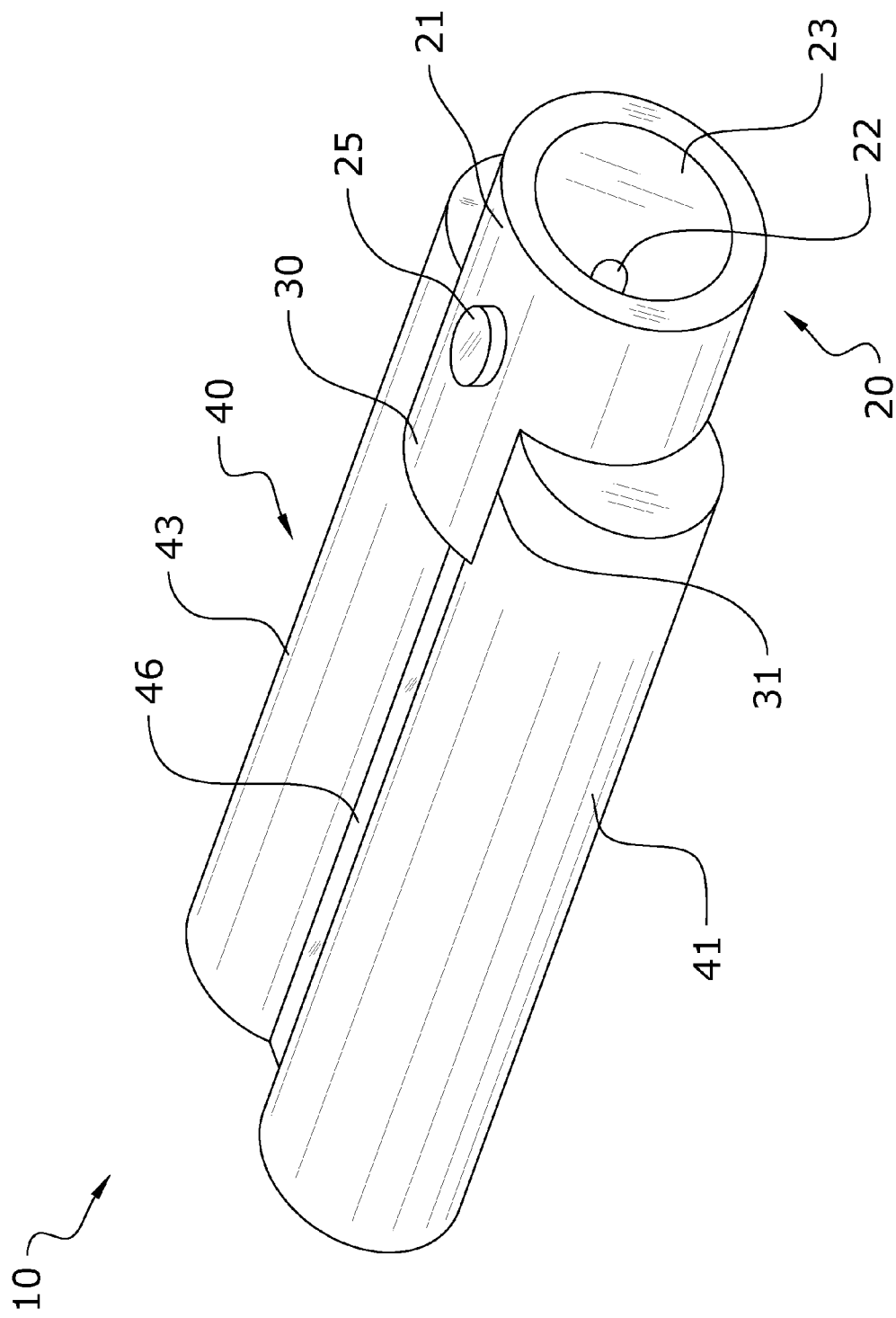
FIG. 1 is an upper perspective view of the present invention illustrating a load module comprised of a light producing assembly and a power module.

Turning now descriptively to the drawings, in which similar reference characters denote similar elements throughout the several views, FIGS. 1 through 14 illustrate a modular device 10, which comprises a plurality of interchangeable load modules 20, 60, 80, 96 wherein each of the load modules has a load 22, 28, 29, 62, 82 connected thereto, wherein the load is different for each load modules, and at least one power module 40, 70, 90 having at least one battery 49, 76 therein, wherein the power module removably separately connects to each of the load modules and wherein the battery(ies) electrically connects to the load for powering the load. The load modules and power modules may be connected in various manners, such as a push-fit, friction, threadably, slidably, bayonet-style, or various other manners to allow quick, easy, and reliable connectivity.

B. Preferred Embodiment

The load module 20 generally includes an outer shell 21, which preferably matches the exterior of the power module 40. The shell 21 generally includes a connecting portion 30 along a linearly rearward end of the shell 21 to receive and connect thereto a power module 40. The shell 21 may further have a knurled finish around a portion or all of the shell 21. The connecting portion 30, as describe previously, may attach to the power module 40 through the use of push-fit, friction, threadably, slidably, or various other manners to allow quick, easy, and reliable connectivity. The components of this embodiment and other embodiments may be comprised of various materials, such as but not limited to aluminum alloy.

In the preferred embodiment, the connecting portion 30 includes a first opening 31 and a second opening 32 extending linearly therein. The first opening 31 and the second opening 32 are each comprised of a semi-circular shape and each face opposite directions. A center portion 34 of the connecting portion 30 is formed by the first opening 31 and the second opening 32 to extend towards a lateral center of the connecting portion 30 along a vertical axis, thus essentially forming a first bulge extending downwardly and a second bulge extending upwardly.

A channel 35 extends through the center portion 34 along the longitudinal axis of the connecting portion 30 and is preferably concentric with the load module 20. The channel 35 extends partially within the load module 20 from a rearward end of the load module 20 to receive the center support 46 of the power module 40. It is appreciated that various gripping, threadable, snap-lock, or other structures may extend from the connecting portion 30 or be integral with the connecting portion 30 for efficiently receiving the power module 40.

As stated, an end of the power module 40 is removably received by the load module 20. The power module 40 generally includes a first tube 41 comprised of an elongated structure and a second tube 43 comprised of an elongated structure. The first tube 41 and the second tube 43 are preferably positioned side-by-side and parallel with one another, so that the end of the first tube 41 is received by the first opening 31 and the end of the second tube 43 is received by the second opening 32. The end of the first tube 41 and the second tube 43 nearest the load module 20 may be open so that the terminals of the batteries 49 engage the electrical contacts 37 of the load module 20.

An elongated center support 46 extends between the first tube 41 and the second tube 43 and is connected on opposite sides to the first tube 41 and the second tube 43. The center support 46 is generally received within the channel 35 extending through the center portion 34 of the connecting portion 30 when attaching the power module 40 to the load module 20.

Each of the tubes 41, 43 are comprised of a cylindrical structure and include an inner cavity 42, 44 extending within to receive a plurality of batteries 49. The batteries 49 may be comprised of rechagable, disposable, primary, lithium, and/or reserve battery structures. It is appreciated that the first tube 41 may have a first type of batteries (e.g. primary) contained therein and the second tube 43 may have a second type of batteries (e.g. reserve) contained therein. In this case, the user may use either the batteries in the first tube 41 or the batteries in the second tube 43. Alternately, batteries of a single type may be positioned in both the first tube 41 and the second tube 43.

In the case of using reserve batteries, such as batteries having an electrolyte separated from electrodes via a breakable barrier, a reserve battery activation system may be used to activate the reserve batteries via the switch 25 or other triggering mechanism, such as one described within U.S. Pat. No. 3,665,178 to Sussingham et al. or U.S. Pat. Nos. 3,716,708 and 3,827,914 to Kaye. U.S. Pat. Nos. 3,665,178, 3,716,708, and 3,827,914 are hereby incorporated by reference. Other types of triggering mechanisms include mechanical, electrical, piezoelectric, pyrotechnic, thermal, magnetic, acoustic, optical, fluid based (e.g. water pressure), gravitational based, and vacuum-pressure induced.

The center support 46 also includes a recess 47 longitudinally extending within the recess 47 from a bottom side. The recess 47 receives a retractable stand 50 which may be on some power modules but absent from others. When in a retracted position the stand 50 is flush with the bottom of the center support 46. When in an extended position, the stand 50 is pivoted outwards so as to rest flat upon a support surface (e.g. table, etc.) and the power module 40 and attached load module 20 are supported in an upright angled position. The stand 50 is pivotally connected to the center support 46 at a first end 51 near the rear of the power module 40 and the second end 52 opposite the first end 51 is angled so as to be perpendicular with the support surface when in the extended position.

Figure 2:
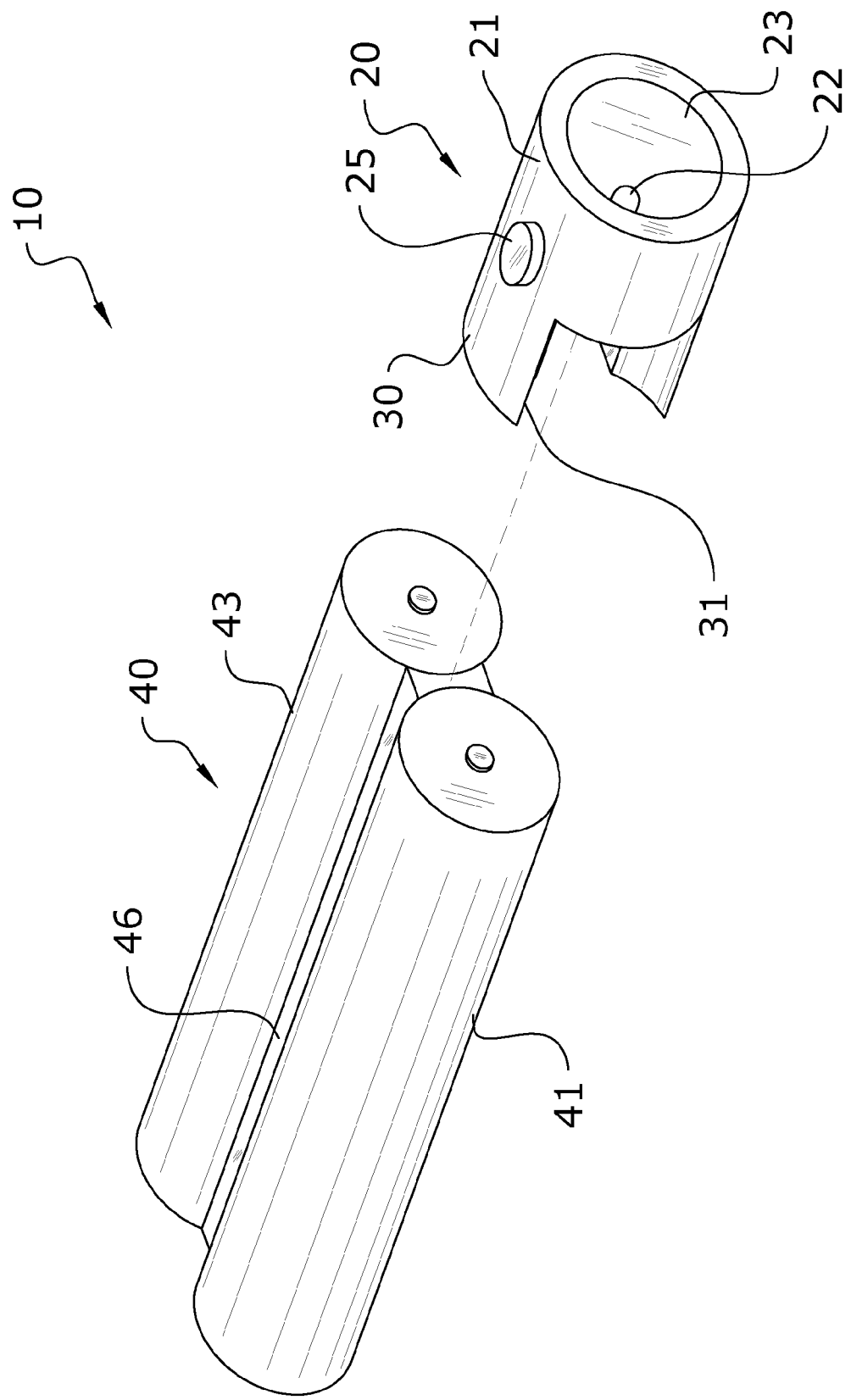
FIG. 2 is an exploded upper perspective view of the present invention illustrating a load module having a light producing assembly and a power module.

As illustrated in the Figures, the load module 20 and power module 40 may be comprised of a plurality of different configurations and arranged in various manners. FIGS. 1 and 2 illustrate the power module 40 being used with the load module 20, wherein the load module 20 is comprised of a light producing assembly, such as to resemble a flashlight. The load module 20 in FIGS. 1 and 2 includes a light component 22, which may be comprised of an LED, incandescent bulb, etc., a lens 23 to protect the light component 22, a switch 25 to activate the light component 22 via allowing current to transfer from the batteries 49, and electrical wiring 26 connecting the various electrical components. It is appreciated that linkage may internally extend from the switch 25 to activate the reserve batteries 49.

Figure 4:
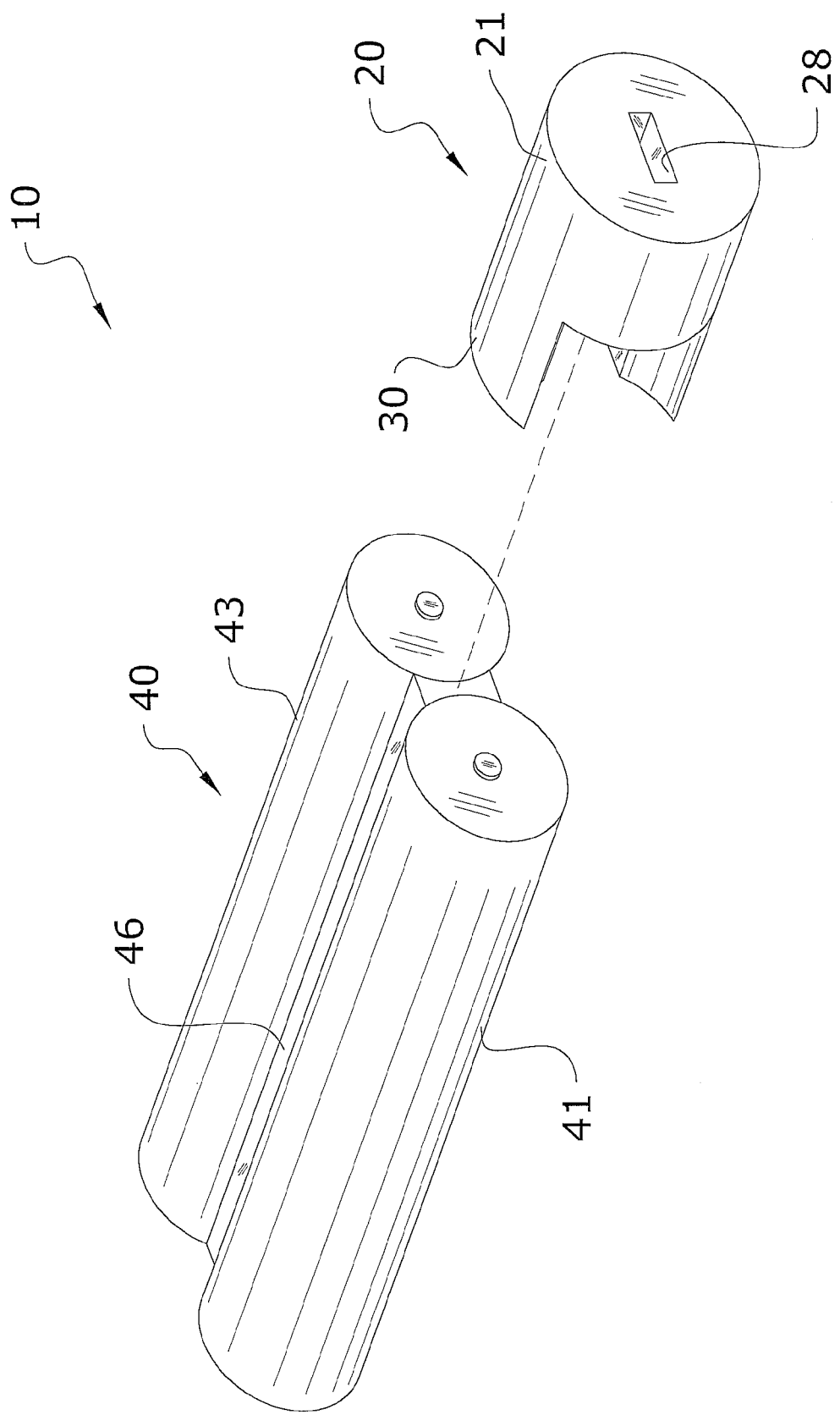
FIG. 4 is an exploded upper perspective view of the present invention illustrating a load module having an external connector and a power module.
Figure 5:
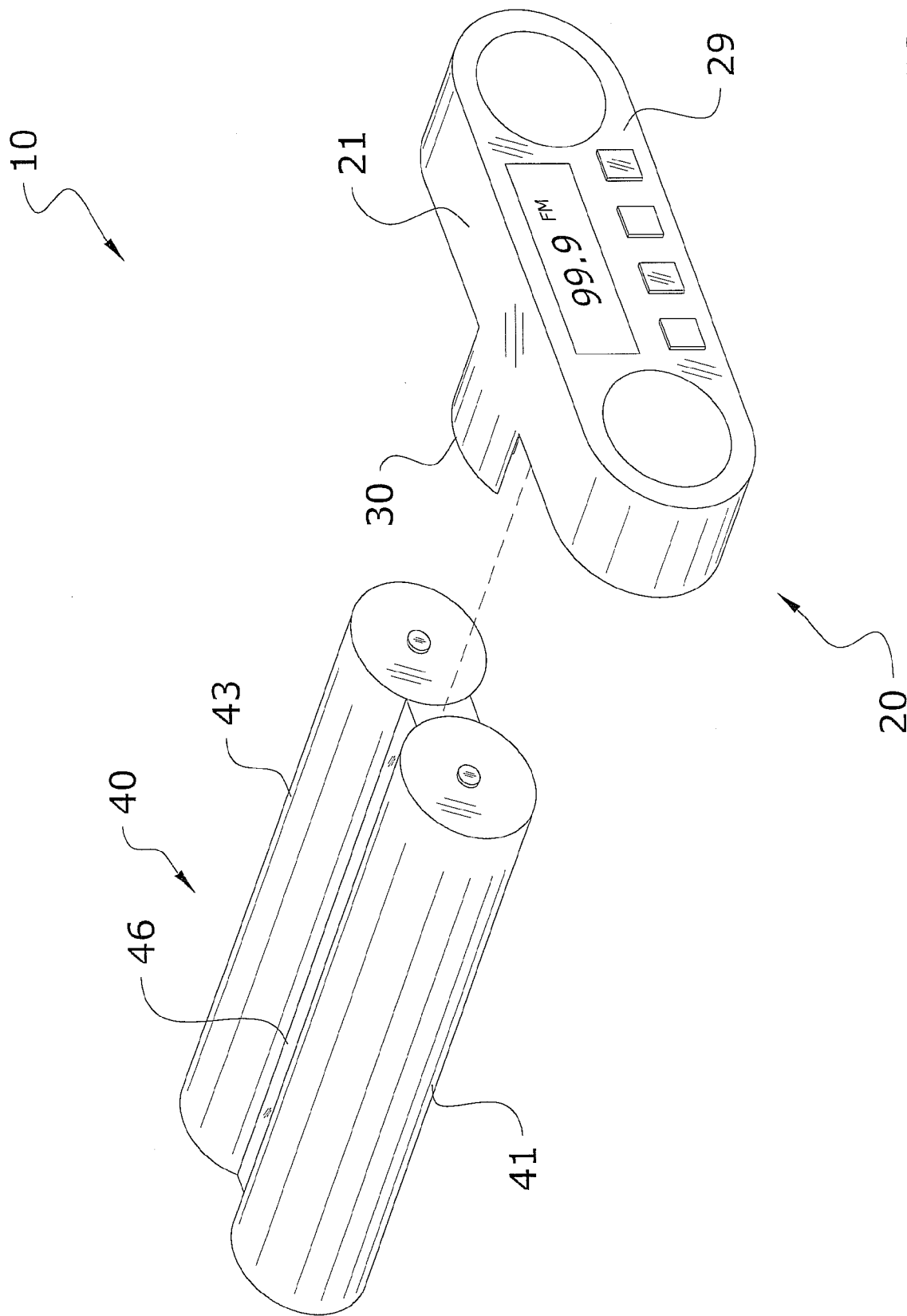
FIG. 5 is an exploded upper perspective view of the present invention illustrating a load module having a radio and a power module.
Figure 6:
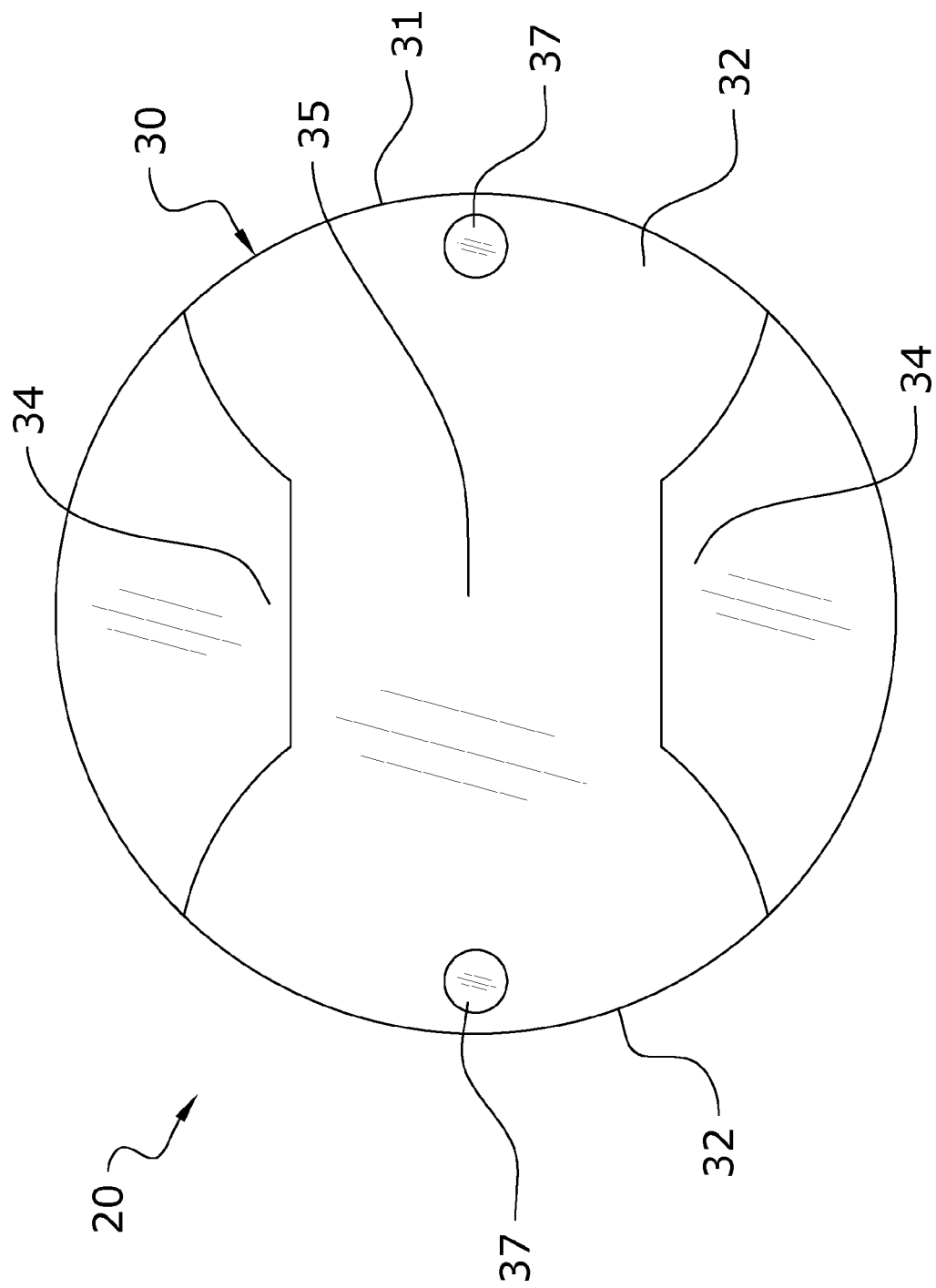
FIG. 6 is a rear view of the load module.
Figure 7:
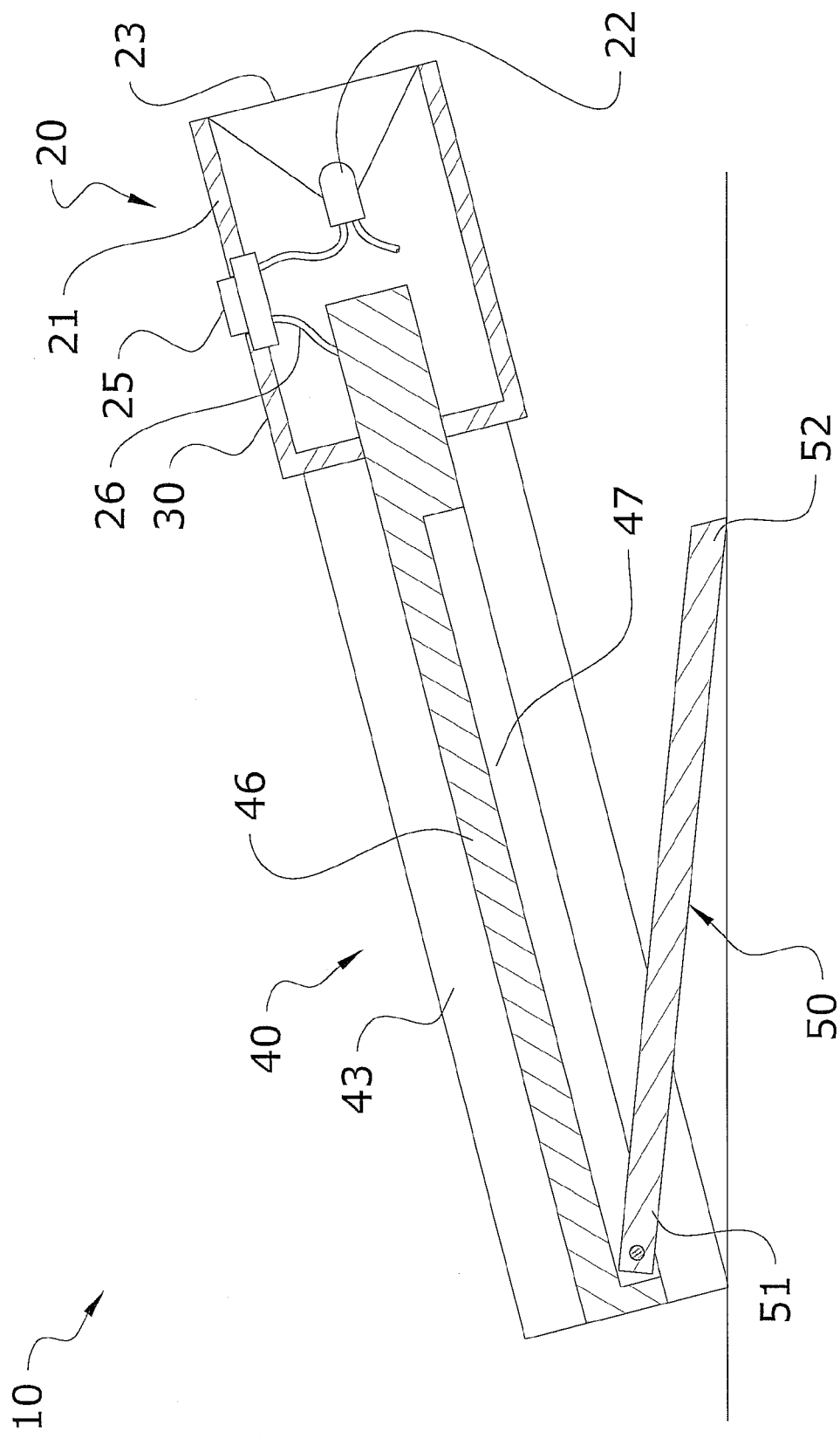
FIG. 7 is a side cross-sectional view of the present invention illustrating the retractable stand in use.
Figure 8:
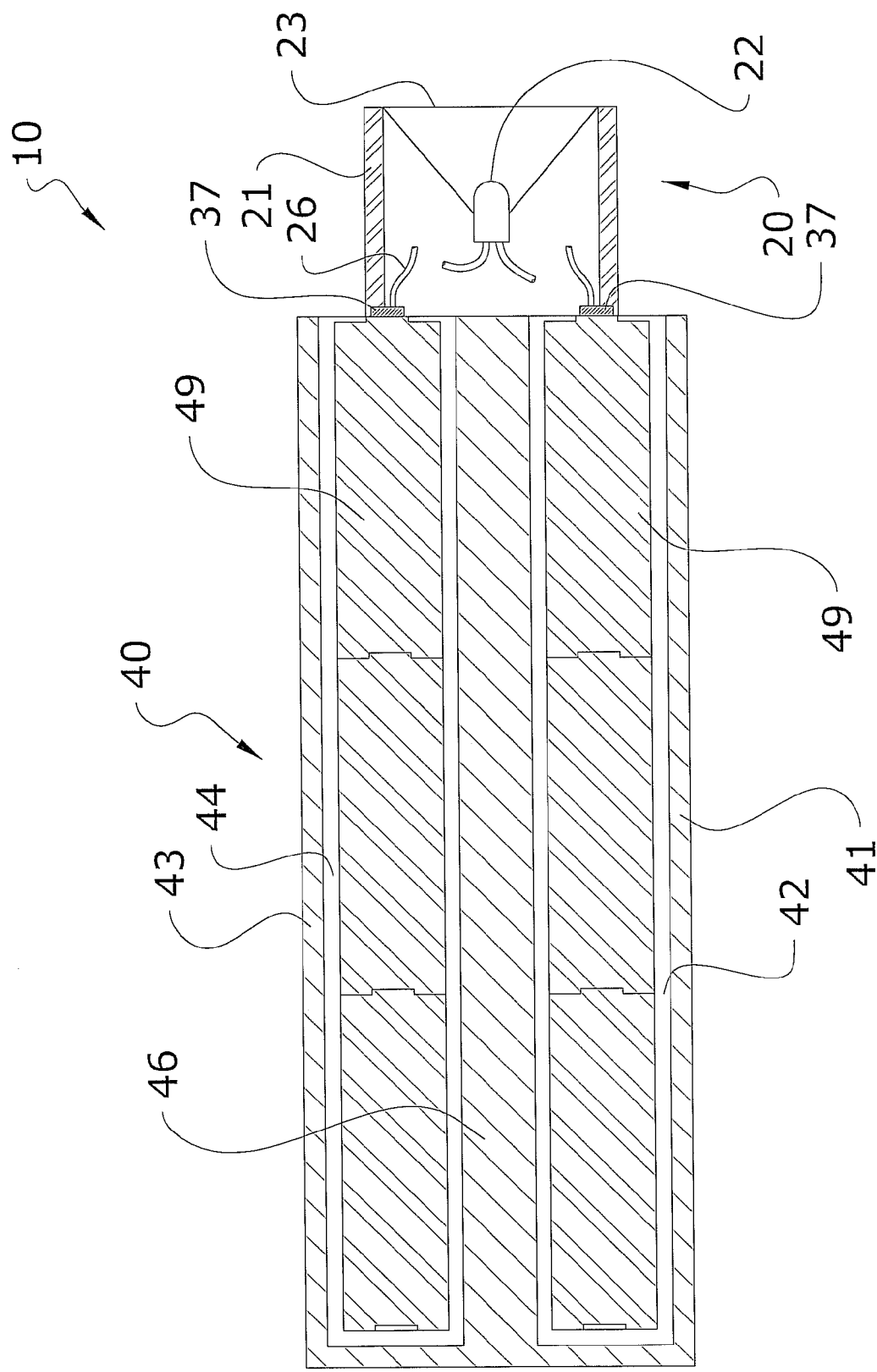
FIG. 8 is a sectional view taken along lines 8-8 of FIG. 1.
Figure 9:
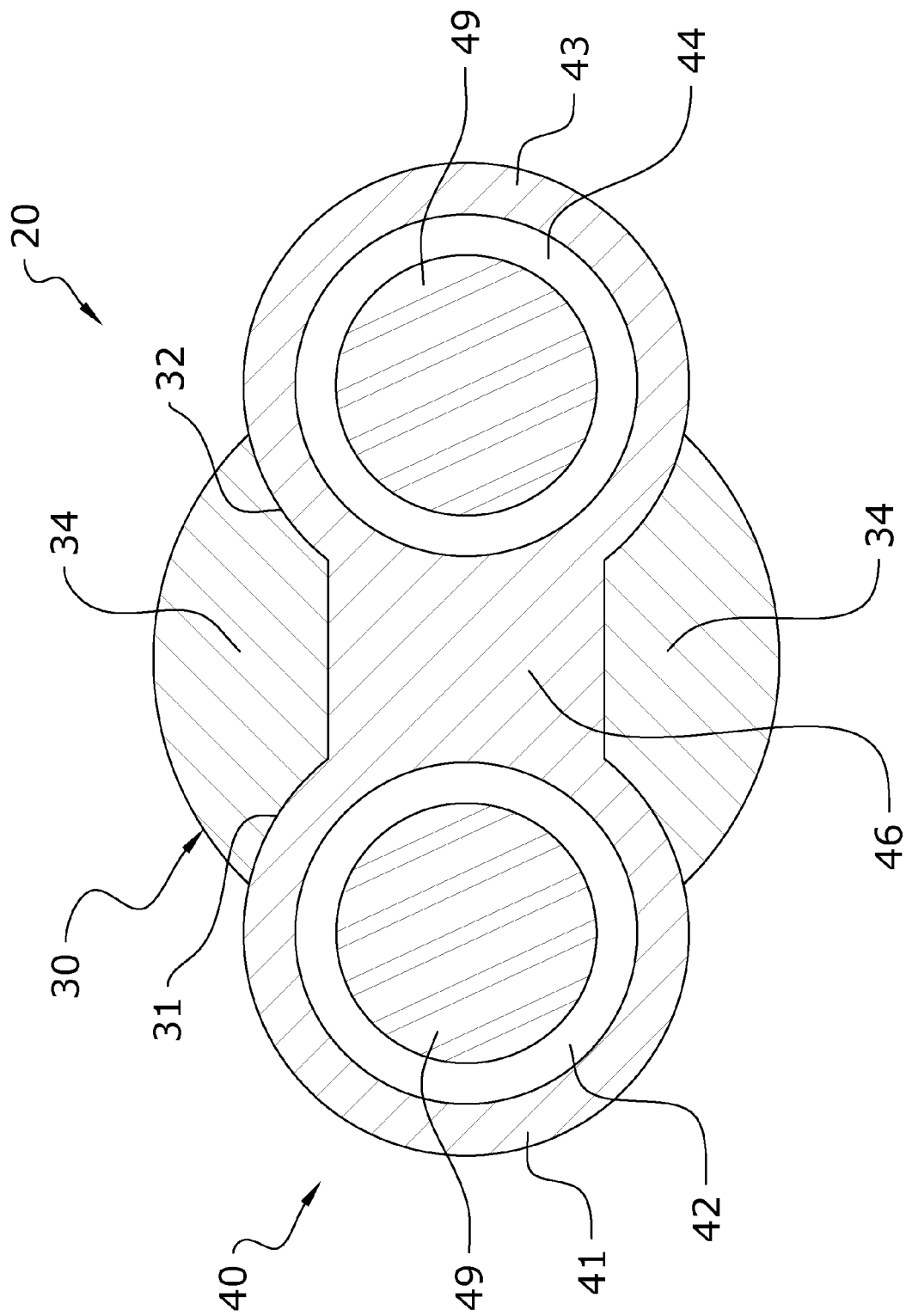
FIG. 9 is a sectional view taken along lines 9-9 of FIG. 1.

The load module 20 may further have various other types of loads, such as an external connector 28 which may be USB connector 28 as illustrated in FIG. 4, a radio 29 as illustrated in FIG. 5, an MP3 player (not shown), or various other electrically powered loads. The external connector 28 may be comprised of various other types of electrical connectors, such as a phone charger, or other adapter. It is appreciated that each load module 20 preferably includes a different load, wherein a user may simply interchange the load modules 20 with the power module 40 when desiring to perform a different function.

Figure 3:
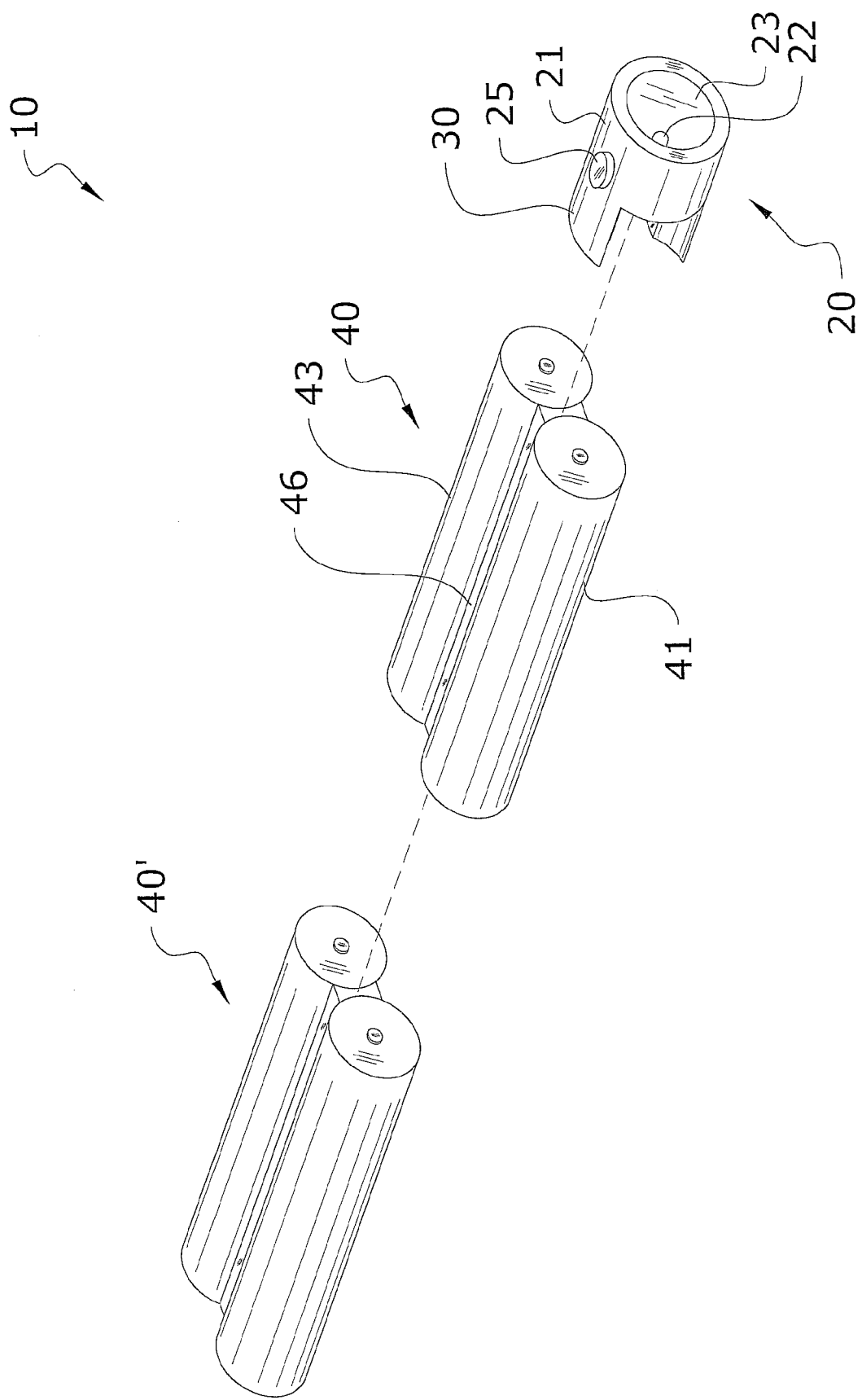
FIG. 3 is an exploded upper perspective view of the present invention illustrating a load module having a light producing assembly and a plurality of power modules.

Similarly, the user may interchange power modules 40 as desired. For example, the user may interchange a power module 40 having all primary (non-reserve) batteries with a power module having all reserve batteries. Alternately, multiple power modules 40, 40' may be connected, such as in a linear manner, as illustrated in FIG. 3. The power modules 40, 40' may connect in a push-fit, friction, threadably, slidably, or various other manners to allow quick, easy, and reliable connectivity. The multiple power modules 40, 40' may be useful when more power is desired, such as when using a different load and load module 20, or when the batteries within the first power module 40 are drained and a second power module 40' is needed.

As appreciated, the first power module 40, the second power module 40', and any additional power modules electrically connect when being connected to each other so that the electrical current can be transferred to the load. As further appreciated, the first power module 40 and/or the load module 20 includes electrical contacts for electrically connecting to the batteries 49 within the power module 40.

C. First Alternate Embodiment

The first alternate embodiment has a similar purpose as the preferred embodiment, which is to allow the interchangeability of multiple load modules 60 and/or power modules 70. The alternate embodiment is included to illustrate that the preferred embodiment may take the form of various shapes and sizes all which essentially perform the same functionality of interchangeable load modules 60 and/or power modules 70.

Figure 10:
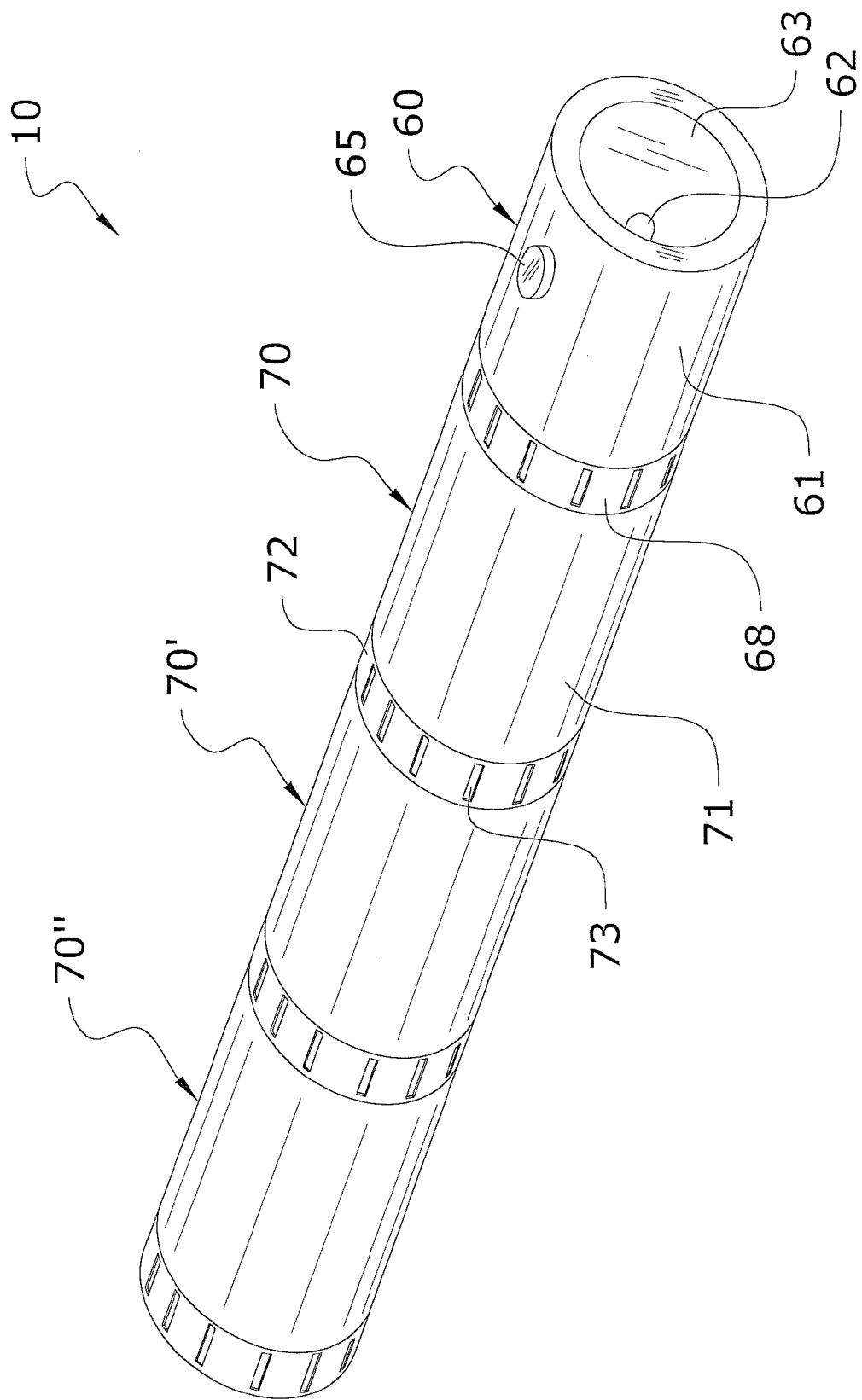
FIG. 10 is an upper perspective view of an alternate embodiment of the present invention illustrating a load module comprised of a light producing assembly and a plurality of power modules.
Figure 11:
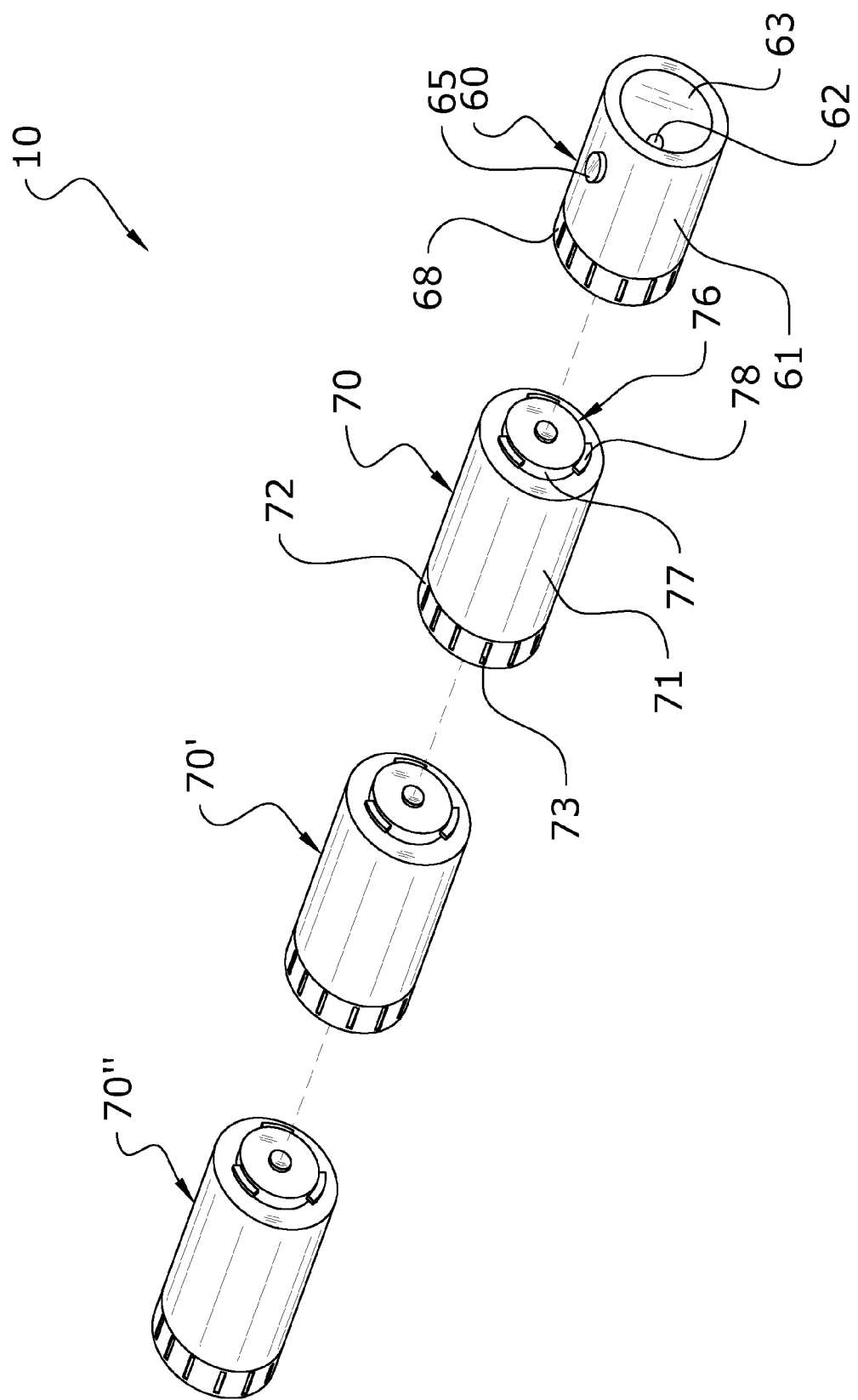
FIG. 11 is an exploded upper perspective view of the alternate embodiment of FIG. 10 illustrating the load module comprised of a light producing assembly and the plurality of power modules.
Figure 12:
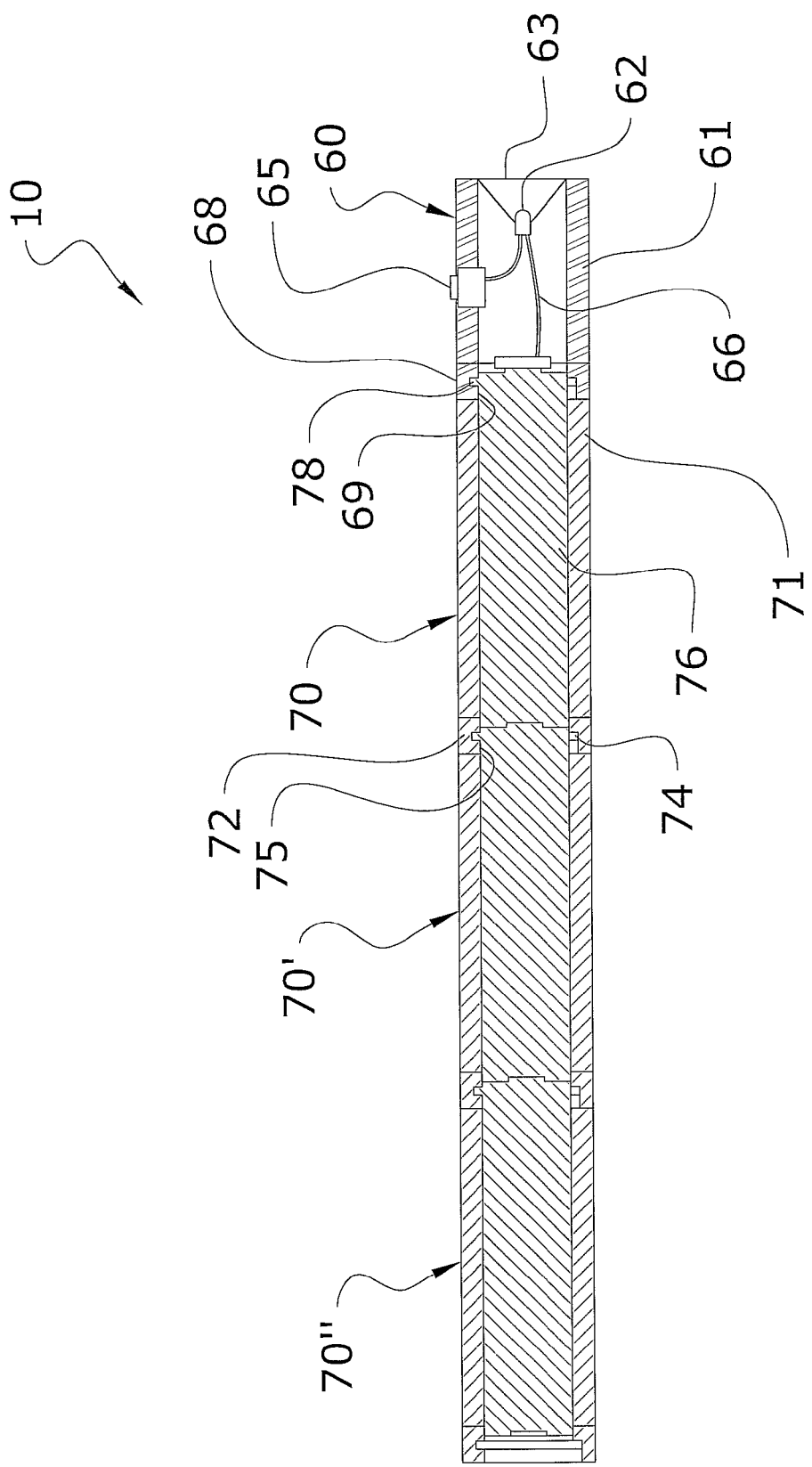
FIG. 12 is sectional view taken along lines 12-12 of FIG. 10.

The alternate embodiment as illustrated in FIGS. 10-12 have at least one load module 60 and a plurality of similar power modules 70, 70', 70" connected in a linear manner. It is appreciated that power module 70, 70', and 70" will herein simply referred to as power module 70. FIG. 12 also illustrates an end space where an additional power module may be attached. The exterior shell of the load modules 60 and the power modules 70 is preferably similar so as to resemble a cylindrical tube. The load module 60, as illustrated in FIGS. 10-12, is comprised of a light producing assembly such as to resemble a flashlight and thereby includes a light component 62, a lens 63, switch 65 and electrical wiring 66 similar to the preferred embodiment. It is appreciated that various other types of loads may be used with the load module 60 as described in the preferred embodiment section.

The load module 60 includes a connecting portion 68 extending linearly from a rearward end of the shell 61 of the load module 60. The connecting portion 68 includes a central recess 69 extending concentrically within. The central recess 69 preferably receives a projecting portion 77 of the battery 76 of the power module 70. The central recess 69 may receive the projecting portion 77 of the battery 76 in a push-fit, threadable, or various other manners.

The central recess 69 may have interior threads to receive projecting members 78 radially extending from the perimeter of the projecting portion 77 of the battery 76. In addition, each power module 70 may have a rotatable portion 72 including a recess 75 which includes interior threads 74 similar to the load module 60 for receiving exterior projecting members 78 of the adjacent battery 76 and power module 70. Each rotatable portion 72 of the power modules 70 may further have grips 73 for allowing easier threadable rotation of the power module 70. It is appreciated that each of the power modules 70 generally include a battery 76 closely surrounded by an exterior shell 71. The battery 76 and the shell 71 of the power module 70 each connect to adjacent power modules 70 or load modules 60. Each power module 70 may have similar types or different types of batteries similar to as described in the preferred embodiment. Further, additional power modules 70 may easily be added in a linear manner to existing power modules 70 if the need for additional batteries exists.

D. Second Alternate Embodiment

The second alternate embodiment has a similar purpose as the preferred embodiment, which is to allow the interchangeability of multiple load modules 80 and/or power modules 90. The alternate embodiment is included to illustrate that the preferred embodiment may take the form of various shapes and sizes all which essentially perform the same functionality of interchangeable load modules 80 and/or power modules 90.

Figure 13:
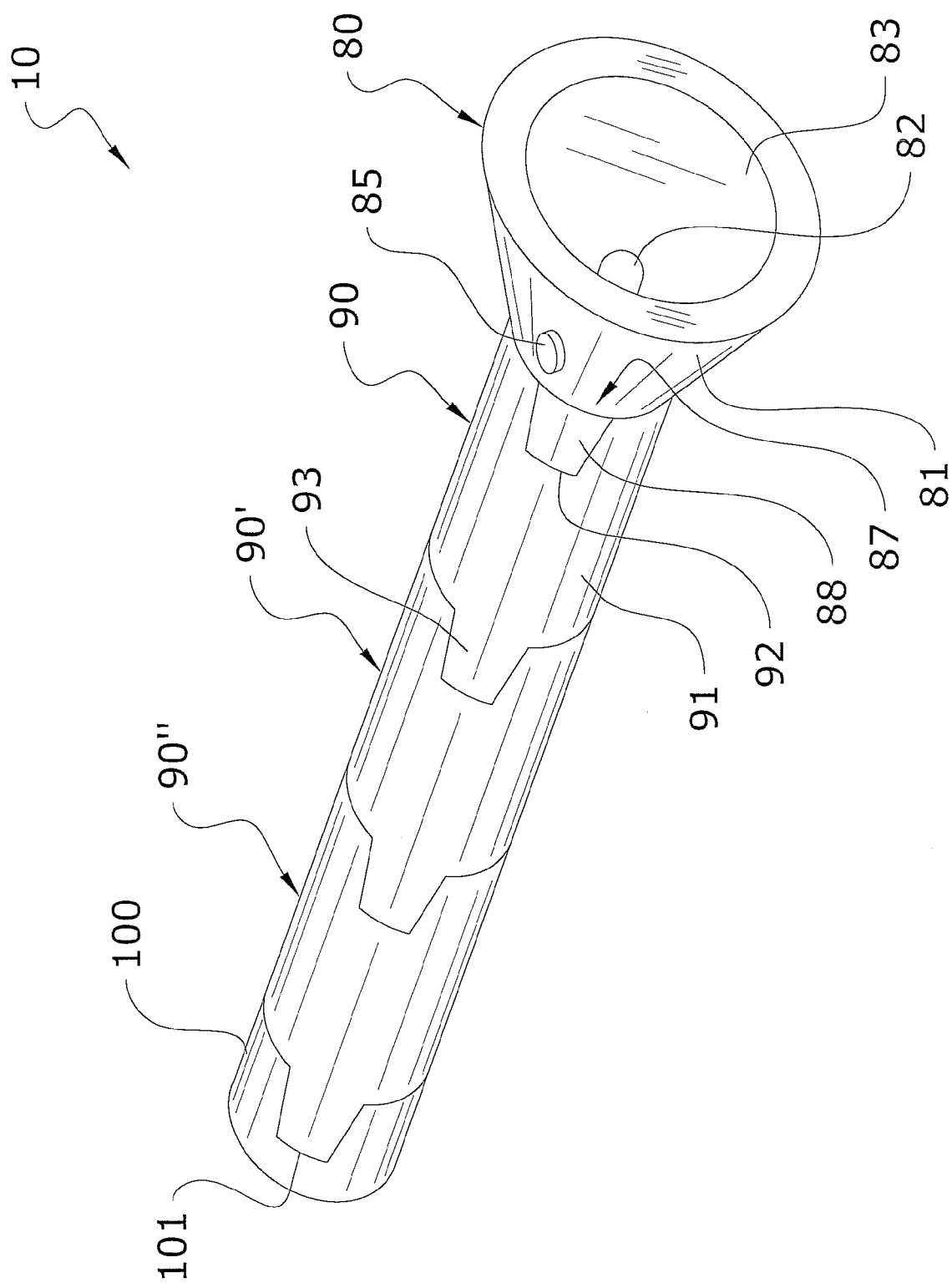
FIG. 13 is an upper perspective view of another alternate embodiment of the present invention illustrating a load module comprised of a light producing assembly and a plurality of power modules.
Figure 14:
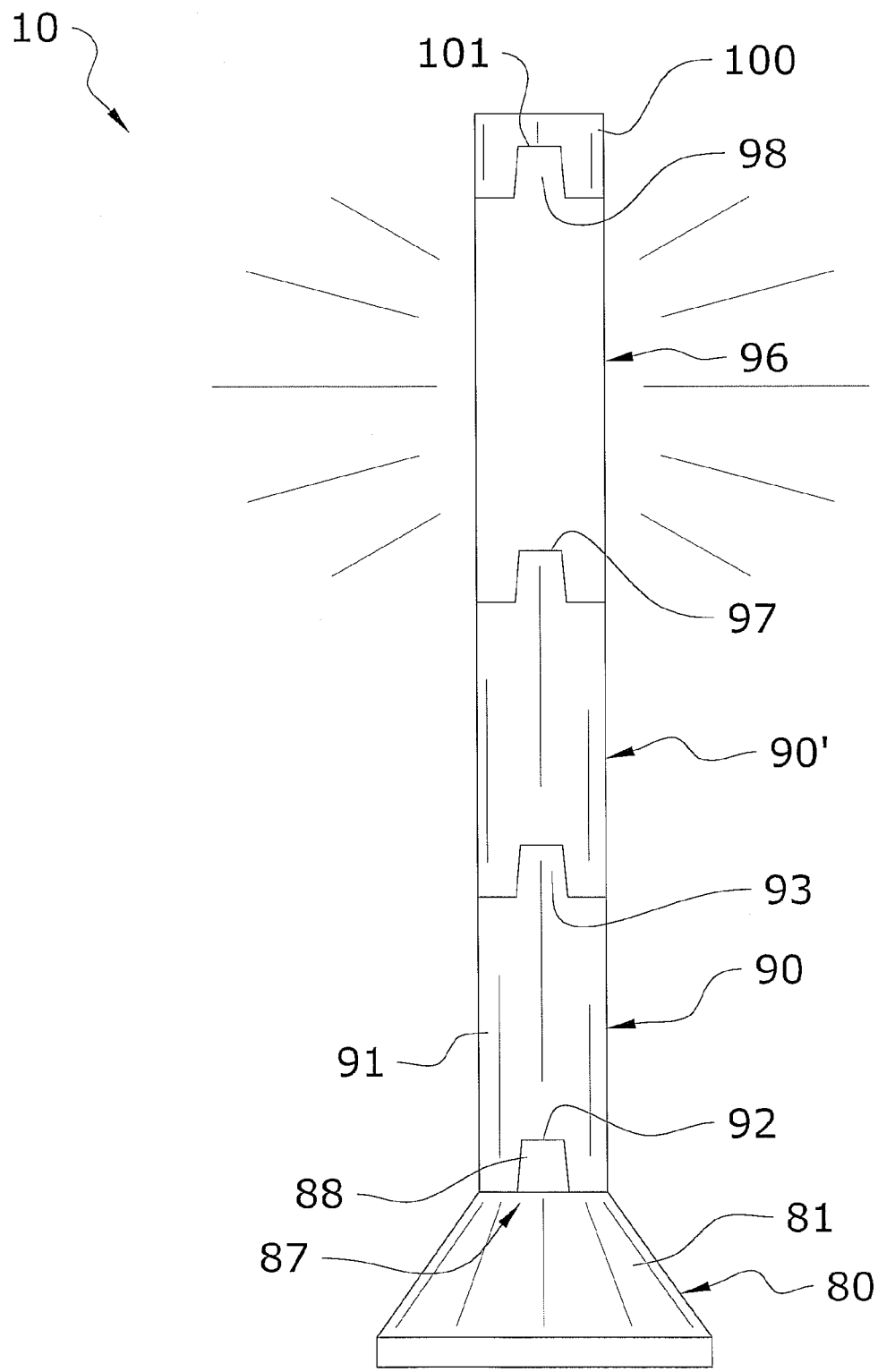
FIG. 14 is a side view of the alternate embodiment of FIG. 13 illustrating a load module comprised of a light producing assembly, a plurality of power modules, and another load module to function as a lamp.

The second alternate embodiment as illustrated in FIGS. 13 and 14 have at least one load module 80, 96 and a plurality of similar power modules 90, 90', 90" connected in a linear manner. It is appreciated that power module 90 and 90' will herein simply referred to as power module 70. The exterior shell 91 of some of the load modules and the power modules 90 is preferably similar so as to resemble a cylindrical tube. The load module 80, as illustrated in FIGS. 13 and 14, is comprised of a light producing assembly such as to resemble a flashlight and thereby includes a light component 82, a lens 83, switch 85 and electrical wiring 86 similar to the preferred embodiment. It is appreciated that various other types of loads may be used with the load module 80 as described in the preferred embodiment section.

The load module 80 includes a tapered shell 81 which tapers from a larger diameter end having the load 82 to a smaller diameter end to connect to the power module 90. The shell 81 includes a connecting portion 87 extending rearwardly to connect to the power module 90. The connecting portion 87 is preferably comprised of projecting members 88 extending rearwardly from the rear perimeter of the shell 81.

The projecting members 88 are spaced apart around the perimeter of shell and are each received by an associated indentation of the power modules 90 in a push-fit, friction, threadably, slidably, or various other manners to allow quick, easy, and reliable connectivity. The power modules 90 thus each include indentations 92 on end to receive projecting members 88, 93 of an adjacent module 80, 90, 96 and projecting members 88, 93 on an opposite end to be receive by indentations 92, 97 of an adjacent module 80, 90, 96, 100. An end cap 100 having indentations 101 may be connected to the end power module 90 or end load module 96.

As shown in FIG. 14, another load module 96 may be connected to the power modules 90 to provide the device 10 with two load modules 80, 96. The load module 96 as shown in FIG. 14 has a load that represents a lamp of a constant illumination style and/or a blinking style; however it is appreciated that various other types of loads may be used. The load module 96 further connects to the power modules 90 in a similar manner as previously described or common with the other modules 80, 90, wherein in this case, the load module 96 includes a plurality of indentations 97 on one end and a plurality of projecting members 98 extending from the opposite end. The load module 96 may include a separate switch or may electrically connect to the existing switch through manners common in the art of electronics. It is appreciated that any features of the described preferred and alternate embodiments may be combined as desired.

E. Operation of Preferred Embodiment

In use, the power module 40 is loaded with the desired type of batteries 49. Additional power modules 40' may be connected if desired. The load module 20 having the desired load (e.g. light, external connector, radio, MP3 player, phone charger) is then connected to the power module 40. The user may then provide power to the load by activating the switch 25 which activates the batteries 49 to provide electrical current to the load. If, at any time, the user desires to use a different load, the current load module 20 is simply removed from the power module 40 and replaced with the desired load module.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A handheld modular device, comprising:
a plurality of interchangeable load modules;
wherein each of said plurality of interchangeable load modules has a load connected thereto, wherein said load is different for each of said plurality of interchangeable load modules; and
at least one power module having at least one battery therein;
wherein said at least one power module separately connects to each of said plurality of interchangeable load modules;
wherein said at least one battery electrically connects to said load for powering said load;
wherein said at least one battery is comprised of a reserve battery;
wherein said at least one power module includes a first inner cavity and a second inner cavity, wherein said second inner cavity is separate from said first inner cavity, and wherein a plurality of first batteries are within said first inner cavity and a plurality of second batteries are within said second inner cavity.

2. The modular device of claim 1, wherein said at least one battery includes a plurality of batteries, wherein said plurality of batteries includes said at least one reserve battery and at least one primary battery.

3. The modular device of claim 1, wherein said at least one power module is comprised of a plurality of power modules connected to each other.

4. The modular device of claim 3, wherein said plurality of power modules includes a first power module having primary batteries and a second power module having reserve batteries.

5. The modular device of claim 1, wherein said first batteries are comprised of primary batteries and wherein said second batteries are comprised of reserve batteries.

6. A handheld modular device, comprising:
a plurality of interchangeable load modules;
wherein each of said plurality of interchangeable load modules has a load connected thereto;
wherein each of said plurality of interchangeable load modules includes a switch for allowing power to transfer to said load;
wherein said each of said plurality of load modules includes a connecting portion having a first opening and a second opening extending therein; and
at least one power module having a first tube and a second tube;
wherein said first tube includes a first inner cavity and wherein said second tube includes a second inner cavity, wherein said first inner cavity and said second inner cavity each receive a plurality of batteries;
wherein said plurality of batteries are electrically connected to a modular head to power said load;
wherein said at least one power module is separately connectable to each of said plurality of interchangeable load modules via said first tube and said second tube being positioned within said first opening and said second opening;
wherein said at least one power module includes a retractable stand.

7. The modular device of claim 6, wherein said plurality of interchangeable load modules includes a first load module having a first load comprised of a light producing component and a second load module having a second load comprised of an external connector.

* * * * *